Nov. 3, 1964 A. BUCHLI 3,154,868
SCRAPER WITH PARALLELOGRAM LINKAGE CONNECTING BUCKET TO FRAME
Filed Oct. 31, 1962 4 Sheets-Sheet 2
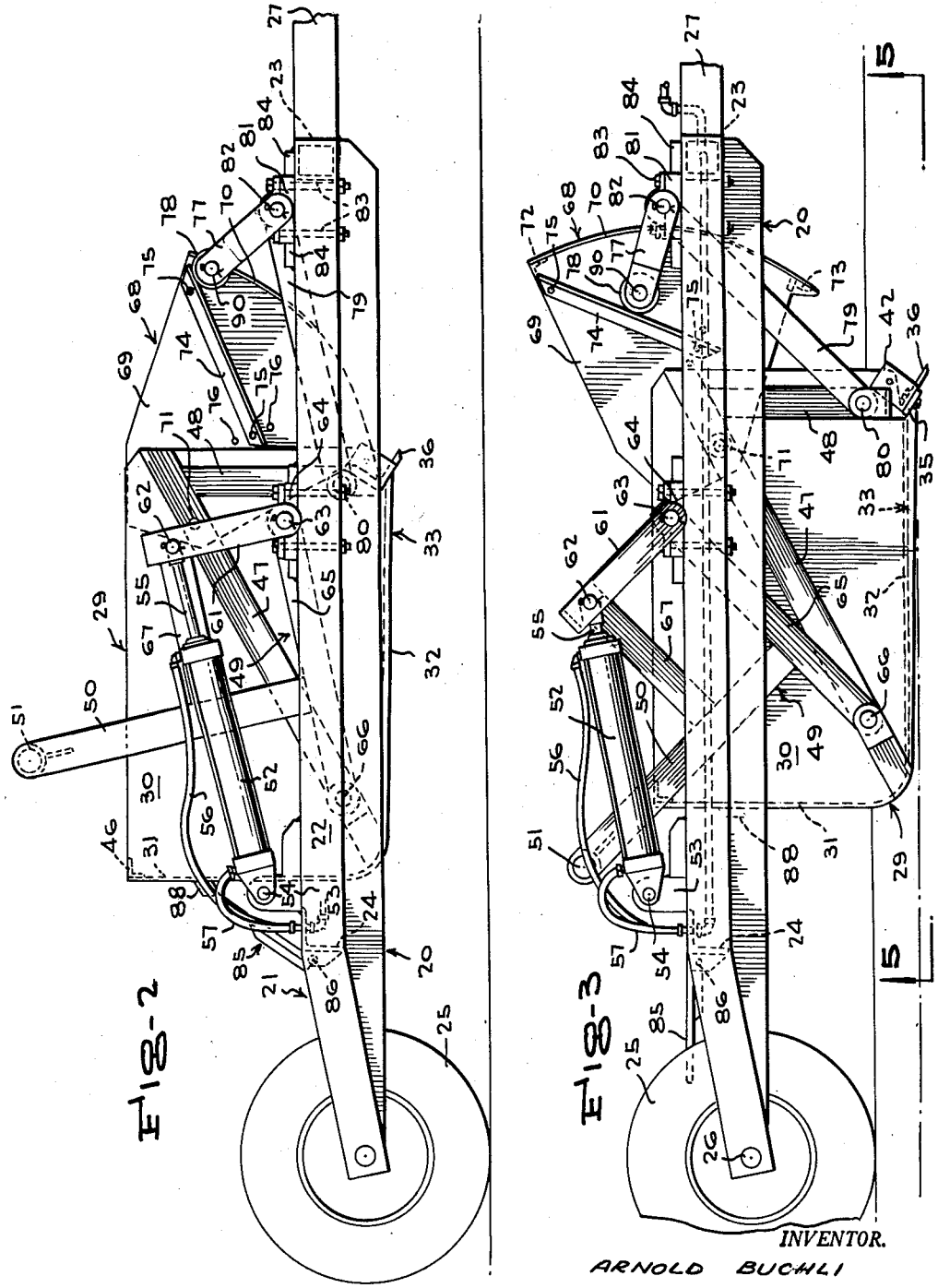
INVENTOR.
ARNOLD BUCHLI
BY
Sherman Levy ATTORNEY

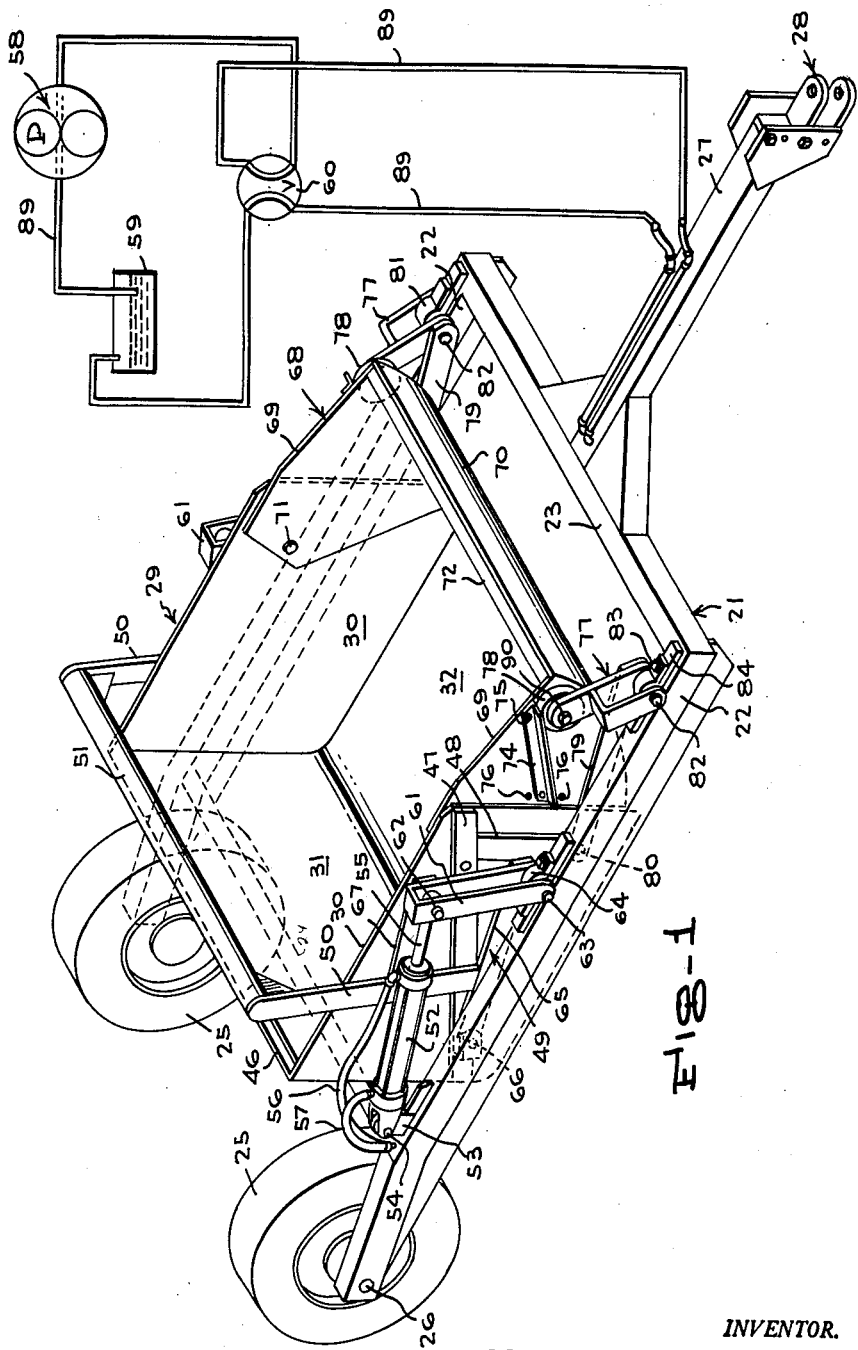

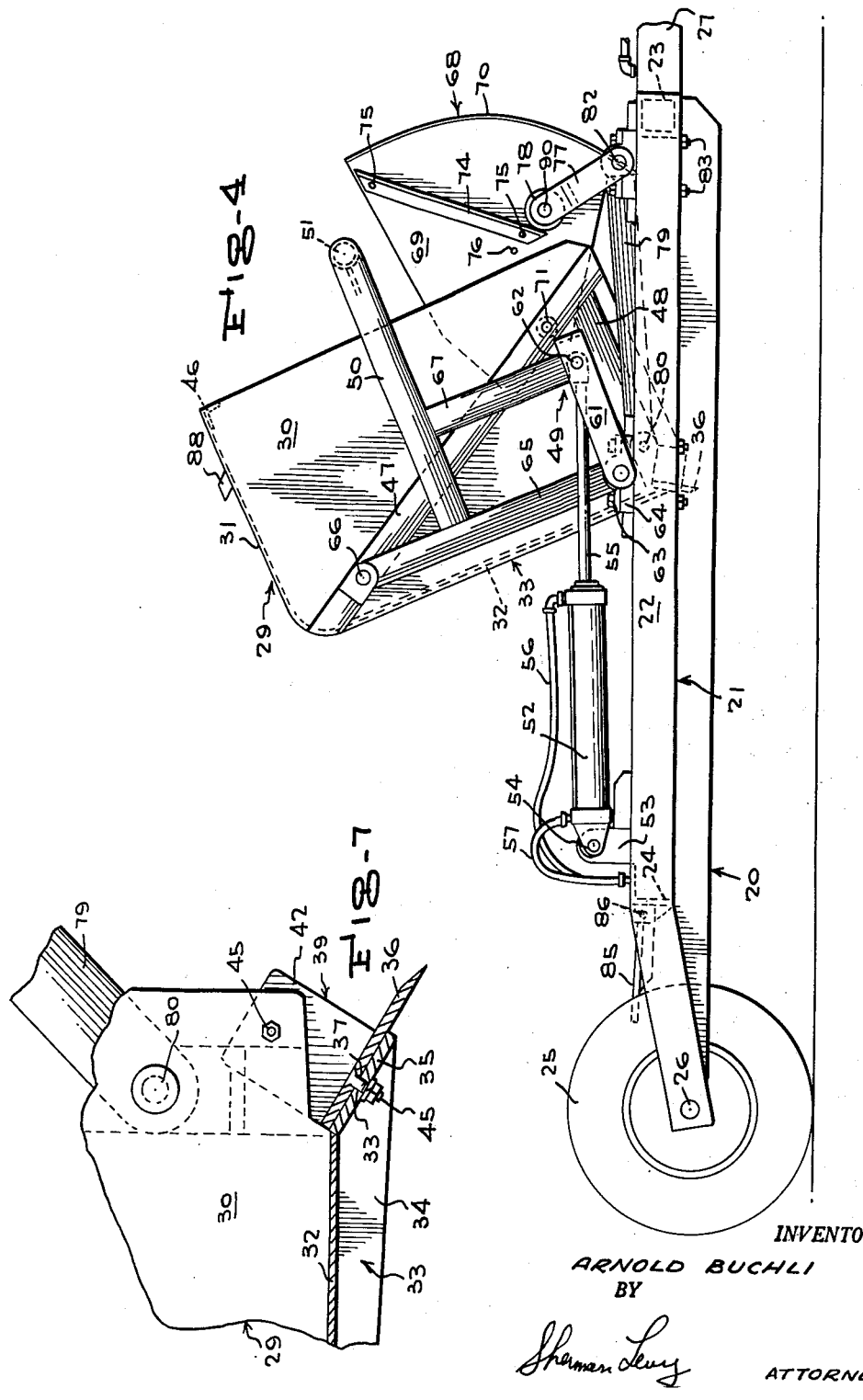

Nov. 3, 1964            A. BUCHLI            3,154,868
SCRAPER WITH PARALLELOGRAM LINKAGE CONNECTING BUCKET TO FRAME
Filed Oct. 31, 1962            4 Sheets-Sheet 4
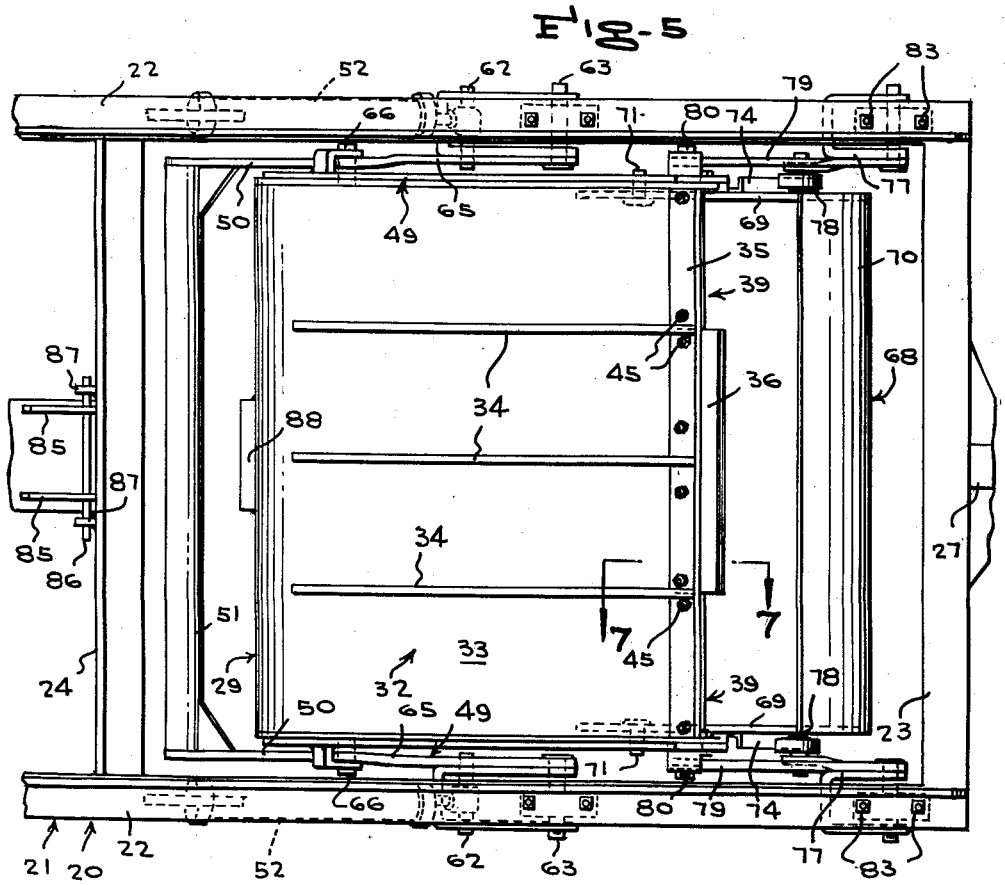
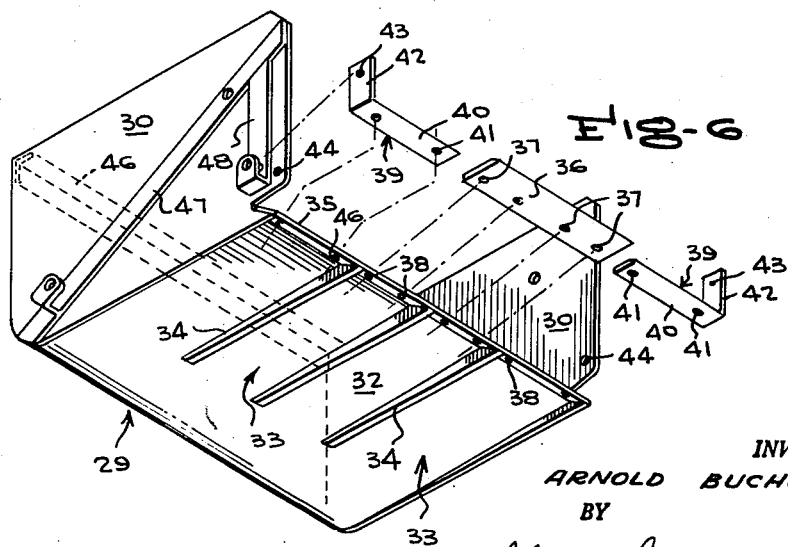
INVENTOR.
ARNOLD BUCHLI
BY
Sherman Levy ATTORNEY

United States Patent Office 3,154,868
Patented Nov. 3, 1964

3,154,868
SCRAPER WITH PARALLELOGRAM LINKAGE
CONNECTING BUCKET TO FRAME
Arnold Buchli, Rte. 2, Ashland, Wis.
Filed Oct. 31, 1962, Ser. No. 234,360
1 Claim. (Cl. 37—129)

This invention relates to earth working equipment, and more particularly to a scraper which is adapted to be mounted rearwardly of and operated from a conventional tractor.

The primary object of the present invention is to provide a scraper which is adapted to be towed behind a tractor, and wherein the scraper of the present invention is adapted to be conveniently operated by the hydraulic system of the tractor from the operator's seat, the scraper including wheels for engagement with the ground, and wherein there is provided hydraulic cylinders on the scraper for causing the various desired or required movements of the parts of the scraper so that for example the scraper can be loaded, dumped, or moved to carrying position.

A still further object of the invention is to provide a tractor operated scraper which includes a load carrying bucket that is adapted to be maintained parallel with the ground so as to cause fast cutting and loading action with less tractor power and less strain on parts of the scraper, and wherein the same linkage provides for fast and smooth dumping of the load.

A further object of the invention is to provide a tractor operated scraper that is extremely simple and inexpensive to manufacture.

Other objects and advantages will be apparent during the course of the following description.

In the accompanying drawings, forming a part of this application, and in which like numerals are used to designate like parts throughout the same:

FIG. 1 is a perspective view of the tractor operated scraper of the present invention, and showing parts of the hydraulic system schematically or diagrammatically.

FIG. 2 is a side elevational view of the tractor operated scraper, with parts broken away, and showing the parts in traveling or carrying position.

FIG. 3 is a view similar to FIG. 2 but showing the parts in loading or scraping position.

FIG. 4 is a view similar to FIGS. 2 and 3 but showing the parts in dumping position.

FIG. 5 is a bottom plan view taken generally on the line 5—5 of FIG. 3.

FIG. 6 is a perspective view of the bucket, with parts separated or disassembled.

FIG. 7 is a sectional view taken on the line 7—7 of FIG. 5.

Referring in detail to the drawings, the numeral 20 indicates the tractor operated scraper of the present invention in its entirety which is shown to comprise a frame 21, and the frame 21 includes a pair of spaced parallel side members 22, and there is provided a cross member 23 which extends between the front ends of the side members 22 and which is secured thereto or formed integral therewith, FIG. 1. The frame 21 further includes a crosspiece 24 which is spaced rearwardly of the cross member 23, and the crosspiece 24 extends between the side members 22 and is secured thereto as by welding.

As shown in the drawings, a pair of ground engaging wheels 25 are connected to the rear ends of the side members 22 as, for example, by means of axles 26, FIGS. 1, 2, 3 and 4. The numeral 27 indicates a tongue which extends forwardly from the cross member 23 and which is secured thereto, and the tongue 27 has a hitch 28 on the front end thereof whereby the hitch 28 can be connected to useful mechanism such as the draw bar of a conventional tractor. The numeral 29 indicates a bucket which is movably mounted between the side members 22.

As shown in the drawings, the bucket 29 includes a pair of spaced parallel vertically disposed side panels 30 as well as a back wall 31 and a floor 32. The side panels 30 extend slightly lower than the floor 32 whereby there is provided or defined a space 33 below the floor 32, and there is provided a plurality of gussets 34 which are mounted in the space 33, FIG. 6. The numeral 35 indicates an inclined mounting member on the lower front portion of the bucket 29, and as shown in the drawings there is provided a center cutting member 36 which is affixed to the mounting member 35, and the center cutting member 36 is provided with apertures or openings 37 which register with similar apertures 38 in the mounting member or portion 35. There is also provided a pair of outer cutting members 39 arranged on opposite sides of the center cutting member 36, and the outer cutting members 39 include horizontal portions 40 which have openings 41 therein, for registering with openings 46 in the mounting member 35, and the outer cutting members 39 further include upstanding sections 42 which have openings 43 for registering with openings 44 in the side panel 30, and suitable securing elements such as bolts 45 are adapted to extend through these registering apertures or openings in order to maintain the cutting members secured in place.

Both sides of the scraper are substantially the same so that a description of one side will suffice for both. Thus, it will be seen that inclined side braces 47 as well as brace pieces 48 are arranged contiguous to the outer surfaces of the side panels 30 and are secured thereto in any suitable manner, as for example by welding. The numeral 49 indicates an actuating mechanism which comprises a pair of spaced parallel arms 50 that are arranged contiguous to the outer surfaces of the side panels 30 and the bucket 29, and the crosstube 51 interconnects the arms 50 together.

As shown in the drawings, there is provided a pair of similar hydraulic cylinders 52 which have their rear ends pivotally connected as at 54 to support elements 53 that are suitably secured to the side members 22 of the frame 21, and movable rods 55 extend forwardly from the front ends of the cylinders 52, and there is provided conduits or hoses 56 and 57 which are connected to the opposite end portions of the cylinders 52. As shown in FIG. 1, a conventional hydraulic system is adapted to be used in conjunction with the cylinders 52, and for example in FIG. 1 the numeral 58 indicates a conventional hydraulic pump while the numeral 59 indicates a reservoir tank, and the numeral 60 indicates a suitable valve assembly for controlling the flow of hydraulic fluid through the system for controlling operation or actuation of the scraper.

There is further provided a pair of generally U-shaped brackets 61 which are connected to the front ends of the rods 55 as at 62, and a pin or shaft 63 connects the lower ends of the brackets 61 to bearing elements 64 which are suitably affixed to the side members 22 of the frame 21, FIG. 1. Legs 65 connect the brackets 61 to the arms 50, and the rear ends of the legs 65 are connected as at 66 to portions of the side braces 47. Bars 67 extend between the brackets 61 and arms 50 and are secured thereto as by welding. The shaft or pin 63 serves to hingedly connect the lower ends of the brackets 61 to the side members 22, and these pins or shafts 63 are also connected to the upper front portions of the legs 65.

The tractor operated scraper of the present invention further includes a front gate which is indicated generally by the numeral 68, and the front gate 68 includes a pair of spaced parallel vertically disposed side walls 69 which are arranged contiguous to the inner surfaces of corresponding side panels 30 of the bucket 29, and the front gate 68 further includes a front wall 70, side wall 69 being hingedly or pivotally connected to the side panels 30 as at 71. Angle pieces 72 and 73 are provided for bracing the upper and lower portions of the front wall 70.

As shown in the drawings, there are provided rails which are affixed to the outer surfaces of the side walls 69 of the front gate 68, and the rails 74 may be secured in place as for example by means of securing elements 75, and as shown in FIG. 1 a plurality of spaced apart apertures or openings 76 may be provided in the side walls 69 so as to permit the securing elements 75 to be extended through different of these openings 76 whereby the position of the rails 74 can be varied or adjusted as desired or required. Support members 77 have rollers 78 journaled thereon, and the rollers 78 are adapted to engage the rails 74 as later described in this application. Links 79 have their lower rear portions connected to the brace pieces 48 as at 80, and there is provided a shaft or pin 82 which extends through the front portions of the links 79, and these shafts 82 engage bearing blocks 81 which are secured to the upper front portions of the side members 22 as, for example, by means of bolts 83, and there is provided retainers 84 for helping maintain these parts in their proper assembled position. The shafts 82 connect the front ends of the links 79 to the support members 77.

As shown in FIG. 5, transport lugs 85 are adapted to be hingedly connected to ears or support elements 87 on the rear portion of the cross-piece 24 of the frame 21, and the lugs 85 may be hingedly mounted by means of a hinge pin or pintle pin 86, and the lugs 85 are adapted to selectively engage one or more stop members 88 on the back wall of the bucket 29.

From the foregoing, it is apparent that there has been provided a tractor operated scraper which is especially suitable for use in various types of earth moving or earth working jobs, and in use with the parts arranged as shown in the drawings, it will be seen that the scraper 20 of the present invention is adapted to be towed or pulled behind a conventional tractor, and the scraper 20 may be attached to the tractor as for example by means of the hitch 28 on the front of the tongue 27, and the wheels 25 permit the scraper to be pulled along the ground in the proper manner. As shown in FIG. 1 conduits or hoses 89 can be provided for interconnecting the various parts of the hydraulic system together and to the hoses 56 and 57 for the hydraulic cylinders 52, and the members such as the members 58, 59 and 60 can be conveniently arranged on the tractor in the usual manner and suitable controls can be arranged so that they are readily accessible to the operator of the tractor whereby the cylinders 52 can be actuated in a desired manner in order to move the piston rod 55 in or out of the cylinders 52 in order to properly position the parts in the desired location. Thus, for example the parts can be arranged as shown in FIG. 2 when the scraper is in traveling or carrying position, or else the parts can be in the position of FIG. 3 when the scraper is being loaded with dirt or the like, or the parts can be moved to the position shown in FIG. 4 when the bucket is to be dumped.

The parts can be made of any suitable material and in different shapes or sizes.

The scraper of the present invention is adapted to be towed by a conventional tractor and the scraper is adapted to be operated by the hydraulic system of the tractor from the operator's seat, the scraper having wheels 25 for movement over the ground. The hydraulic cylinders 52 are provided on the scraper to cause the various movements for loading, carrying and dumping of earth. An important feature of the present invention is that due to the provision of the linkage, the load carrying bucket 29 is maintained parallel with the ground causing fast cutting and loading action with less tractor power and less strain on the parts of the scraper, and this same linkage provides for fast and smooth dumping of the load. FIG. 2 illustrates the load carrying or transport position, FIG. 3 illustrates cutting or loading position, and FIG. 4 shows the dumping position, and FIG. 7 for example shows the relationship of the cutting edge to the load carrying bucket and the method of attaching the same thereto. It is to be understood that all of the parts on one side of the scraper are generally duplicated on the other side in the same manner, and basically the machine of the present invention consists of a rectangular frame 21 which includes the box steel side members 22 and the front cross member 23 and at the rear the angle 24 serves as the crosspiece or cross member. Wheels 25 may be provided with rubber tires, and suitable bearings can be provided for these wheels. The front of the scraper is supported by the tractor draw bar from the tongue or pole 27. The load carrying bucket 29 is positioned within the frame members 22, and the bucket is constructed so that its side panels 30 extend slightly lower than the floor of the bucket, and this provides for reinforcement of the bucket and the mounting or supporting member 35 which serves as a mount for hardened cutting edges or members 36 and 39. Also contained within the space beneath the floor 32 are the plurality of evenly spaced gussets or reinforcements 34 which may be secured as by welding to the mount 35 and to the floor 32. The floor 32 and rear wall 31 of the bucket may be of one-piece construction, and the angle member 46 helps reinforce the upper edge of the rear wall 31. Braces 47 and 48 help reinforce the side wall or side panel 30 and provide suitable mountings for the pins or pivots of the actuating mechanism.

The center cutting edge or member 36 extends slightly beyond the outer cutting edges or members 39 so as to provide for better cutting action, and the cutting members may be bolted as at 45 to the mounting portion 35, and the portions 42 may be bolted to the side panels of the bucket 29.

The crosstube 51 connects the arms 50 together so as to insure that both sides of the actuating mechanism will work in unison, when powered by the hydraulic cylinders 52. The cylinders 52 are adapted to be anchored to the frame as at 53 and 54, and the forward or rod end of each cylinder is anchored as at 62 to a corresponding bracket 61. Hydraulic pressure from a pump such as the pump 58 on the towing vehicle is adapted to be conveyed through conduits 89 to the pipes or conduits 56 and 57 so that pressure can be applied through the cylinders to cause lifting and dumping action, and the hydraulic pressure can be directed in such a manner so as to cause lowering and cutting action of the bucket as desired or required.

The front gate 68 is provided for preventing loss of load, and this gate includes side walls 69 as well as the front wall 70 which may be reinforced at the top and bottom thereof, and the gate 68 is connected to the load carrying bucket at points 71. The front of the gate 68 rides on the rollers 78 by means of the rails 74 which are secured as by bolts 75 to the side walls 69 of the gate 68. Adjustment holes 76 are provided in the gate 68 to permit moving of the rails 74 to different positions to govern the opening distance between the cutting edge of the bucket and the lower edge of the gate. The rollers 78 for actuating the gate 68 are attached to the member 77 by suitable pins or axles 90, and suitable grease fittings can be used wherever desired or required.

The front actuating arms or links 79 are attached to the load carrying bucket 29 by means of pins 80, and the shaft 82 is welded to the links 79 to provide a rigid connection at this point. The arms 50 are attached to the rear of the load carrying bucket 29 through the medium of the members 65 which are connected as at 66 to the bucket. Bearing blocks 64 and 81 provide suitable mountings for the pivot points, and anchor elements or retainers are adapted to be provided on each side of the bearing blocks to prevent the shearing or mounting bolts such as the bolts 83 from working loose or shearing whereby the bearing blocks will be held securely to the frame side members.

It is to be noted that by applying fluid pressure to the conduits 57 of the cylinders 52, the rod 55 will move against the pivot 62 so that load carrying bucket 29 will be lifted at the point 66. Since the links 79 extend the same distance between the points 80 and 82 as the element 65 between the points 66 and 63, and since the members 79 are connected to the front of the load carrying bucket by means of the pins 80, the desired pivotal movement will take place at the point 82. This arrangement causes the load carrying bucket 29 to be maintained parallel to the frame 21 from a cutting or loading position to a somewhat elevated carrying position. After an elevated carrying position is reached or attained, the rear of the bucket 29 will break over center so as to cause the rear of the bucket to tip up and dump the load, and at this time the distance between the pins 71 and 90 is the least or is at a minimum whereby the front gate 68 will have moved ahead over the rollers 78 so as to permit the load to be expelled.

Also, when the distance between the points 90 and 71 is the maximum or greatest, the front gate 68 will have moved back over the rollers 78 so as to cause it to be in a downward or closed position against the cutting edge. This takes place when the bucket 29 is in an elevated carrying position. When the bucket is again lowered into a loading position, the distance between the points 90 and 71 will slightly decrease so as to cause the gate 68 to move forward and upward over the roller 78 to provide an opening so that earth will load freely into the bucket.

Relative to break over center, it is to be noted that when in an elevated carrying position, the bucket 29 and points 66 and 80 will be in parallel position relative to the frame 21, at which time points 66, 63, 80, and 82 will be almost directly in line. Raising over this position is breaking over center. When this position is reached, point 80 will remain in its same position since it will contact the forward end of arm 65 and point 66 will keep raising to a dumping position.

As shown in the drawings, the transport bars or lugs 85 are provided for facilitating the movement of the scraper over a highway or the like, and these lugs 85 may be attached to the frame by means of the pin 86, and these lugs 85 are adapted to rest against the bracket stops 88 on the bucket 29. When the scraper is in use, these lugs are adapted to fold down out of the way.

Minor changes in shape, size and rearrangement of details coming within the field of invention claimed may be resorted to in actual practice, if desired.

What is claimed is:

An earth moving scraper comprising a frame, a plurality of ground engaging wheels mounted on said frame, a load carrying bucket having a floor, a ground engaging blade on the forward edge of said floor, an apron pivotally mounted on the front of said bucket and providing a closure for the forward end thereof, said bucket being movable between a plurality of positions including:

a lowered digging position wherein said floor is substantially parallel to said frame, a carrying position wherein said floor is substantially coplanar with said frame, an elevated dumping position in which said floor is in an acute angle relationship with said frame, and means connecting said frame and said bucket for movement of said bucket from said carrying position to said digging position and to said dumping position and maintaining said bucket floor substantially parallel to said frame at all points intermediate said digging and said carrying positions, said means including: parallelogram linkage systems comprising a foremost and a rearmost link on each side of said bucket, the forward ends of said links being fixedly pivotally mounted on the frame substantially in a first plane, said first plane being substantially coplanar with said frame, the rearward ends of said links being fixedly pivotally mounted on said bucket substantially in a second plane, said second plane being substantially parallel to said floor, said links being substantially the same length, said links being substantially parallel in said digging and carrying positions, said rearmost links being in an obtuse angle relationship with said foremost links when said bucket is in said dumping position, means for stopping the foremost links as they become coplanar with the frame, power means attached to the rearmost links only and mounted on said frame for moving said bucket and said parallelogram linkage system whereby as said links become substantially coplanar with said frame, the foremost links cease rotating and the rearmost links continue rotating as said bucket assumes the dumping position.

References Cited by the Examiner

UNITED STATES PATENTS

| | | | |
|---|---|---|---|
| 1,817,985 | 8/31 | Jamison | 37—129 |
| 2,174,749 | 10/39 | Hutchins | 37—126 |
| 2,304,786 | 12/42 | Armington | 37—129 |
| 2,445,260 | 7/48 | Brimhall | 37—129 |
| 2,514,782 | 7/50 | Miskin | 37—129 |
| 2,566,901 | 9/51 | McGee | 37—129 |
| 2,716,824 | 9/55 | Francis | 37—141 X |
| 2,941,318 | 6/60 | Beck | 37—126 |
| 3,011,274 | 12/61 | Richter | 37—141 |

CHARLES E. O'CONNELL, *Primary Examiner.*

R. RIORDON, BENJAMIN HERSH, *Examiners.*